US012013324B2

(12) United States Patent
Vermant et al.

(10) Patent No.: US 12,013,324 B2
(45) Date of Patent: Jun. 18, 2024

(54) ROTATIONAL SHEAR RHEOMETER AND METHOD FOR DETERMINING MECHANICAL PROPERTIES OF A SAMPLE

(71) Applicant: ETH ZURICH, Zurich (CH)

(72) Inventors: Jan Vermant, Zürich (CH); Bram Schroyen, Antwerp (BE)

(*) Notice: Subject to any disclaimer, the term of this patent is extended or adjusted under 35 U.S.C. 154(b) by 0 days.

(21) Appl. No.: 17/774,554

(22) PCT Filed: Nov. 2, 2020

(86) PCT No.: PCT/EP2020/080622
§ 371 (c)(1),
(2) Date: May 5, 2022

(87) PCT Pub. No.: WO2021/089451
PCT Pub. Date: May 14, 2021

(65) Prior Publication Data
US 2022/0397506 A1 Dec. 15, 2022

(30) Foreign Application Priority Data

Nov. 6, 2019 (EP) .................................... 19207473

(51) Int. Cl.
*G01N 11/16* (2006.01)
*G01N 3/24* (2006.01)

(52) U.S. Cl.
CPC ............ *G01N 11/165* (2013.01); *G01N 3/24* (2013.01); *G01N 2203/0094* (2013.01)

(58) Field of Classification Search
CPC .................. G01N 11/165; G01N 3/24; G01N 2203/0094; G01N 11/167; G01N 11/162

USPC ...... 73/54.01, 54.39, 847, 856, 860, 862.191
See application file for complete search history.

(56) References Cited

FOREIGN PATENT DOCUMENTS

| CN | 206417224 U | * 8/2017 |
|---|---|---|
| DE | 10029091 | 1/2002 |
| EP | 1178298 | 2/2002 |

* cited by examiner

*Primary Examiner* — Robert R Raevis
(74) *Attorney, Agent, or Firm* — JMB DAVIS BEN-DAVID (57) ABSTRACT

The invention relates to a rotational shear rheometer (1) comprising a first plate (10), a first flexure (11) pivotally connecting the first plate (10) to a support (60), a piezoelectric element (40) extending along a longitudinal axis (L) arranged tangentially in respect of the first plate (10), wherein said piezoelectric element (40) is configured to elongate and/or undergo compression along said longitudinal axis (L), and wherein said first end (41) is mechanically coupled to said first plate (10), wherein said first flexure (11) comprises a first flexural element (12) and a second flexural element (13) non-parallel to the first flexural element (12), wherein the first flexural element (12) and the second flexural element (13) connect said first plate (10) to said support (60), extend radially in respect of the pivot axis (P) and intersect with the pivot axis (P), wherein said piezoelectric element (40) is further configured as a sensor capable of detecting a torque acting on said first plate (10). Furthermore, the invention relates to a method for determining mechanical properties of a sample using the rotational shear rheometer.

14 Claims, 8 Drawing Sheets

ROTATIONAL SHEAR RHEOMETER AND METHOD FOR DETERMINING MECHANICAL PROPERTIES OF A SAMPLE

CROSS-REFERENCE TO RELATED APPLICATIONS

This is the U.S. National Stage of International Patent Application No. PCT/EP2020/080622 filed on Nov. 2, 2020, which in turn claims the benefit of European Patent Application No. 19207473.0 filed on Nov. 6, 2019.

Rotational shear rheometer and method for determining mechanical properties of a sample The invention relates to a rotational shear rheometer and method for determining mechanical properties of a sample by means of the rheometer, particularly a high frequency (i.e. 20 Hz or above) mechanical impedance measurement.

High-frequency rheology is a form of mechanical spectroscopy which gives insight into the local dynamics and microstructure of complex materials, such as viscoelastic fluids and solids.

Commercial rotational rheometers known from the prior art are limited in their maximum frequency range to 20-50 Hz due to inertia. However, it is highly desirable to use higher frequencies, in particular to analyze complex materials whose dynamics cannot be described by a single microscopic timescale. Examples of such applications are the analysis of colloids, measuring segment dynamics of polymers or supramolecular systems or assessing the local structure and dispersion state of colloidal dispersions and filled polymer melts.

DE 100 29 091 describes a rotational shear rheometer comprising six piezoelectric elements arranged on a spider-web-shaped assembly of spokes, which periodically bend in response to an actuation by the piezoelectric elements. However, this setup exhibits a limited dimensional stability (resonance effects need to be removed via modeling to reach frequencies in the kHz range), hence a limited upper frequency, high complexity due to different spokes and separate actuator/sensor elements that need to be aligned, and sub-optimal accuracy due to the bending moments introduced to the sensor piezo elements.

EP 1 178 298 discloses a rotational rheometer comprising a bendable metal foil with piezoelectric elements arranged on either side of the foil, coupled to a shaft that is connected to the top plate of the rheometer. This arrangement is relatively flexible resulting in resonances inducing complex flow fields, such that operation at elevated frequencies (particularly in the kHz range) is difficult, and the sensitivity of the setup for a single actuator-sensor pair is limited by the applied deformation mode of the piezoelectric elements.

Therefore, the objective of the present invention is to provide a rotational shear rheometer suitable for high frequency (i.e. at least 20 Hz) rheological measurements which is improved in view of the above-stated drawbacks of the prior art, particularly to provide a high frequency rotational shear rheometer which is robust and can be combined with existing devices in a simple manner.

This objective is attained by the subject matter of the independent claims 1 and 15. Sub claims 2 to 14 and the specification below relate to favorable embodiments of the invention. A first aspect of the invention relates to a rotational shear rheometer comprising a first plate configured to contact a sample, a first flexure connecting the first plate to a support (in particular a support comprised in the rotational shear rheometer), such that the first plate is pivotable about a pivot axis in respect of the support, and a piezoelectric element extending between a first end of the piezoelectric element and a second end of the piezoelectric element along a longitudinal axis, wherein the longitudinal axis is arranged tangentially in respect of the pivot axis. Particularly, the pivot axis runs through the center of mass of the first plate.

The first plate is configured to contact a sample, meaning that in particular, the first plate, together with a separate second plate or cone, is configured to form a gap for arranging a sample (i.e. a fluid or a solid) in the gap to determine rheological properties (such as elasticity, viscosity or viscoelasticity) of the sample. In this manner, the rheometer according to the invention can be combined with other rheometers, particularly using the first plate as a bottom geometry and the separate second plate or cone as a top geometry.

Particularly, the rotational shear rheometer according to the invention is capable of and/or configured to perform a mechanical impedance measurement at a frequency of 20 Hz or more.

As used herein, the term "tangential" (with respect to the pivot axis) describes a direction of a line which is perpendicular to a diameter of the first plate and perpendicular to the pivot axis. The first plate particularly has a circular cross-section in respect of the pivot axis.

Alternatively, other suitable shapes may be applied. Particularly in case of a non-circular cross-section of the first plate, the term 'diameter' describes a line crossing the center of mass of the first plate.

The term "flexure" as used within this specification describes a component consisting of or comprising a flexural element. The term "flexural element" within the context of this specification describes a member which can be elongated, compressed or bent, particularly wherein the member has a stiffness (i.e. translational stiffness, rotational stiffness or bending stiffness) lower than the stiffness of the piezoelectric element, particularly lower than $10^6$ N/m, more particularly $10^5$ N/m or less in respect of at least one direction of displacement or rotation.

The piezoelectric element is configured to elongate and/or undergo compression along the longitudinal axis (upon applying a voltage to the piezoelectric element resulting in an electric field and hence in a mechanical deformation). The first end of the piezoelectric element is mechanically coupled or connected to the first plate. The piezoelectric element is configured as an actuator capable of introducing a torque to the first plate about the pivot axis, such that the first plate is pivoted about the pivot axis, as a result of an elongation or compression of the piezoelectric element along the longitudinal axis. In particular, this pivoting motion may result in a shear deformation of a sample in contact with the first plate, e.g. in a gap between the first plate and a second plate or a cone. In particular, the piezoelectric element is separate from the first plate and is not pivoted along when the first plate pivots about the pivot axis.

The piezoelectric element is further configured as a sensor capable of detecting a torque or a force acting on the first plate, particularly in response to the shear deformation of the sample.

In other words, a single piezoelectric element is used both as an actuator and a sensor. This reduces the complexity and cost of the device, and eliminates the need for alignment of different actuators and sensors.

The first flexure comprises a first flexural element, particularly a first leaf spring, and a second flexural element, particularly a second leaf spring, wherein the second flexural element is non-parallel to the first flexural element. The first flexural element connects the first plate to the support and the second flexural element connects the first plate to the support. Furthermore, the first flexural element and the second flexural element both extend radially in respect of the pivot axis, particularly along a respective length.

Therein the term "radial" (in respect of the pivot axis) describes a direction of a line which is perpendicular to the pivot axis and extends through (intersects) the center of mass of the first plate.

The first flexural element and the second flexural element intersect with the pivot axis, particularly at the center of mass of the first plate, where the first flexural element and the second flexural element also intersect with each other at the center of mass of the first plate.

In other words, the first flexural element can be described as cross-shaped or X-shaped.

Such an X-shaped flexure has the advantage that it allows essentially only one degree of freedom, namely a rotation or pivoting motion about the pivot axis, while this type of flexure is especially stiff towards translational movements, which allows operation at relatively high frequencies (20 Hz or more).

In particular, the first flexural element has a length extending radially in respect of the pivot axis, a height parallel to the pivot axis and a thickness perpendicular to its length and its height. In particular, the second flexural element has a length extending radially in respect of the pivot axis, a height parallel to the pivot axis and a thickness perpendicular to its length and its height.

In certain embodiments, the first flexural element and the second flexural element each extend along their respective height between a respective bottom end and a respective top end of the respective flexural element, wherein particularly the respective bottom end is connected to the support and the respective top end is connected to the first plate. In certain embodiments, the first flexural element extends along its height between a bottom end and a top end of the first flexural element, wherein particularly the bottom end is connected to the support and the top end is connected to the first plate. In certain embodiments, the second flexural element extends along its height between a bottom end and a top end of the second flexural element, wherein particularly the bottom end is connected to the support and the top end is connected to the first plate.

In certain embodiments, the first flexural element and the second flexural element each extend along their respective thickness between a respective first lateral end and a respective second lateral end of the respective flexural element. In certain embodiments, the first flexural element extends along its thickness between a first lateral end and a second lateral end of the first flexural element. In certain embodiments, the second flexural element extends along its thickness between a first lateral end and a second lateral end of the second flexural element.

In certain embodiments, a ratio between the height of the first flexural element and the thickness of the first flexural element is at least 2:1, particularly at least 5:1, more particularly at least 10:1. These ratios result in corresponding stiffness differences between different modes of deformations.

In certain embodiments, a ratio between the height of the second flexural element and the thickness of the second flexural element is at least 2:1, particularly at least 5:1, more particularly at least 10:1.

In certain embodiments, the thickness of the first flexural element and/or the thickness of the second flexural element is 50 µm to 500 µm, particularly 150 µm to 350 µm, more particularly 250 µm.

This results in a high stiffness of the first flexure perpendicular to the longitudinal axis and a lower stiffness along the longitudinal axis.

In certain embodiments, the first flexural element and/or the second flexural element is formed from titanium or a titanium alloy.

In certain embodiments, the first flexural element and the second flexural element each extend along their respective length between a respective first end and a respective second end of the respective flexural element. In certain embodiments, the first flexural element extends along its length between a first end and a second end of the first flexural element. In certain embodiments, the second flexural element extends along its length between a first end and a second end of the second flexural element.

In certain embodiments, the support, the first flexural element and the second flexural element are formed from one piece.

In certain embodiments, the first flexural element of the first flexure is arranged at an angle of 70° to 110°, more particularly 80° to 100°, most particularly 90°, with respect to the second flexural element of the first flexure, particularly in a plane extending perpendicular to the pivot axis.

In certain embodiments, the first flexural element has a translational stiffness $k_T = F\delta$, particularly in respect of a displacement along the pivot axis or the longitudinal axis, and a rotational stiffness $k_R = M/\theta$ in respect of a rotation or pivoting motion about the pivot axis, wherein the ratio between the translational stiffness $k_T$ and the rotational stiffness $k_R$ divided by a radius r of the first plate is at least 10:1, particularly at least 100:1, more particularly at least 1000:1.

In certain embodiments, the second flexural element has a translational stiffness $k_T = F\delta$, particularly in respect of a displacement along the pivot axis or the longitudinal axis, and a rotational stiffness $k_R = M/\theta$ in respect of a rotation or pivoting motion about the pivot axis, wherein the ratio between the translational stiffness $k_T$ and the rotational stiffness $k_R$ divided by a radius r of the first plate is at least 10:1, particularly at least 100:1, more particularly at least 1000:1.

In certain embodiments, the first flexure has a translational stiffness $k_T = F\delta$, particularly in respect of a displacement along the pivot axis or the longitudinal axis, and a rotational stiffness $k_R = M/\theta$ in respect of a rotation or pivoting motion about the pivot axis, wherein the ratio between the translational stiffness $k_T$ and the rotational stiffness $k_R$ divided by a radius r of the first plate is at least 10:1, particularly at least 100:1, more particularly at least 1000:1.

Thereby, a pivoting motion of the first plate is allowed, but other translational movements of the first plate are blocked. This improves dimensional stability, reduces or eliminates residual deformations under normal operations (e.g. thickness variations) and avoids resonances at low frequencies.

In certain embodiments, the first flexural element has a rotational stiffness $k_R = M/\theta$ of at least $10^5$ N/m in respect of a rotation about the pivot axis.

In certain embodiments, the second flexural element has a rotational stiffness $k_R = M/\theta$ of at least $10^5$ N/m in respect of a rotation about the pivot axis.

In certain embodiments, the first flexure has a rotational stiffness $k_R=M/\theta$ of at least $10^5$ N/m, particularly $10^5$ N/m to $10^6$ N/m in respect of a rotation about the pivot axis.

In certain embodiments, the first flexure has a translational stiffness along the pivot axis of at least $10^8$ N/m.

In certain embodiments, the rotational shear rheometer comprises a second flexure mechanically coupling the first end of the piezoelectric element to the first plate. In other words, the second flexure directly or indirectly connects the first end of the piezoelectric element to the first plate. In particular, the second flexure is arranged such that a torque can be applied to the first plate via the second flexure when the piezoelectric element extends or undergoes compression.

When flexible connections between the second flexure and the piezoelectric element are foreseen (e.g. using flexural/joining elements or applying pre-compression), the second flexure advantageously avoids bending moments on the piezoelectric element which may occur when the piezoelectric element is directly connected to the first plate.

In certain embodiments, the second flexure comprises a third flexural element and a fourth flexural element, wherein the third flexural element extends perpendicular to the longitudinal axis, in particular along a respective length of the third flexural element, and the fourth flexural element extends perpendicular to the longitudinal axis, in particular along a respective length of the fourth flexural element.

In certain embodiments, the third flexural element has a length extending perpendicular to the longitudinal axis, a height parallel to the pivot axis and a thickness perpendicular to its length and its height. In particular, the fourth flexural element has a length extending perpendicular to the longitudinal axis, a height parallel to the pivot axis and a thickness perpendicular to its length and its height.

In certain embodiments, the third flexural element and the fourth flexural element each extend along their respective height between a respective bottom end and a respective top end of the respective flexural element, wherein particularly the respective bottom end is connected to the support. In certain embodiments, the third flexural element extends along its height between a bottom end and a top end of the third flexural element, wherein particularly the bottom end is connected to the support. In certain embodiments, the fourth flexural element extends along its height between a bottom end and a top end of the fourth flexural element, wherein particularly the bottom end is connected to the support.

In certain embodiments, the third flexural element and the fourth flexural element each extend along their respective thickness between a respective first lateral end and a respective second lateral end of the respective flexural element. In certain embodiments, the third flexural element extends along its thickness between a first lateral end and a second lateral end of the third flexural element. In certain embodiments, the fourth flexural element extends along its thickness between a first lateral end and a second lateral end of the second flexural element.

In certain embodiments, the third flexural element and the fourth flexural element each extend along their respective length between a respective first end and a respective second end of the respective flexural element. In certain embodiments, the third flexural element extends along its length between a first end and a second end of the third flexural element. In certain embodiments, the fourth flexural element extends along its length between a first end and a second end of the fourth flexural element.

In certain embodiments, a ratio between the height of the third flexural element and the thickness of the third flexural element is at least 2:1, particularly at least 5:1, more particularly at least 10:1.

In certain embodiments, a ratio between the height of the fourth flexural element and the thickness of the fourth flexural element is at least 2:1, particularly at least 5:1, more particularly at least 10:1.

In certain embodiments, the thickness of the third flexural element and/or the thickness of the fourth flexural element is 50 μm to 500 μm, particularly 150 μm to 350 μm, more particularly 250 μm.

In certain embodiments, the third flexural element and/or the fourth flexural element is formed from titanium or a titanium alloy.

In certain embodiments, the support, the third flexural element and the fourth flexural element are formed from one piece.

In certain embodiments, the third flexural element and/or the fourth flexural element are connected to the support.

In certain embodiments, the third flexural element and the fourth flexural element each have a respective first translational stiffness $k_1=F/\delta$ in respect of a displacement 8 perpendicular to the longitudinal axis L and a respective second translational stiffness $k_2=F/\delta$ in respect of a displacement 8 along the longitudinal axis L, wherein a ratio $k_1/k_2$ between the respective first translational stiffness $k_1$ and the respective second translational stiffness $k_2$ is at least 10:1, particularly at least 100:1.

In certain embodiments, the second flexure has a first translational stiffness $k_1=F/\delta$ in respect of a displacement 8 perpendicular to the longitudinal axis L and a second translational stiffness $k_2=F/\delta$ in respect of a displacement 6 along the longitudinal axis L, wherein a ratio $k_1/k_2$ between the first translational stiffness $k_1$ and the second translational stiffness $k_2$ is at least 10:1, particularly at least 100:1.

In other words, the second flexure is configured, such that essentially only translations in a direction perpendicular to the longitudinal axis (extension of the piezoelectric element) are allowed.

In certain embodiments, the second flexure has a second translational stiffness $k_2=F/\delta$ of at least $10^5$ N/m in respect of a displacement along the longitudinal axis.

In certain embodiments, the second flexure comprises a joining element mechanically coupling the first end of the piezoelectric element and the first plate, particularly wherein the third flexural element and the fourth flexural element extend from a respective bottom end to a respective top end (particularly along their respective height), wherein the joining element is connected to the top end of the third flexural element and the top end of the fourth flexural element.

In certain embodiments, the first plate comprises a radial extension extending radially in respect of the pivot axis, wherein the radial extension is mechanically coupled to the first end of the piezoelectric element, wherein particularly the radial extension is mechanically coupled to the first end of the piezoelectric element by the second flexure, wherein more particularly the second flexure comprises a longitudinal extension extending along the longitudinal axis, wherein the longitudinal extension of the second flexure is mechanically coupled to the radial extension of the first plate.

In certain embodiments, the rotational shear rheometer comprises a third flexure mechanically coupled to the second end of the piezoelectric element, wherein particularly the third flexure comprises a fifth flexural element extending perpendicular to the longitudinal axis, wherein particularly the fifth flexural element is connected to the support. The third flexure facilitates positioning and/or alignment of the piezoelectric element.

In particular, the fifth flexural element has a length extending perpendicular to the longitudinal axis, a height extending parallel to the pivot axis and a thickness extending perpendicular to the length and the height.

In certain embodiments, the fifth flexural element extends along its height between a bottom end and a top end of the fifth flexural element, wherein particularly the bottom end is connected to the support.

In certain embodiments, the fifth flexural element extends along its thickness between a first lateral end and a second lateral end of the fifth flexural element.

In certain embodiments, the fifth flexural element extends along its length between a first end and a second end of the fifth flexural element.

In certain embodiments, a ratio between the height of the fifth flexural element and the thickness of the fifth flexural element is at least 2:1, particularly at least 5:1, more particularly at least 10:1.

In certain embodiments, the thickness of the fifth flexural element is 50 µm to 500 µm, particularly 150 µm to 350 µm, more particularly 250 µm.

In certain embodiments, the fifth flexural element is formed from titanium or a titanium alloy.

In certain embodiments, the support and the fifth flexural element are formed from one piece.

In certain embodiments, the fifth flexural element has a first translational stiffness $k_1=F/\delta$ in respect of a displacement 6 perpendicular to the longitudinal axis and a second translational stiffness $k_2=F/\delta$ in respect of a displacement 8 along the longitudinal axis, wherein a ratio $k_1/k_2$ between the first translational stiffness $k_1$ and the second translational stiffness $k_2$ is at least 10:1, particularly at least 100:1.

In certain embodiments, the third flexure has a first translational stiffness $k_1=F/\delta$ in respect of a displacement 8 perpendicular to the longitudinal axis and a second translational stiffness $k_2=F/\delta$ in respect of a displacement 6 along the longitudinal axis, wherein a ratio $k_1/k_2$ between the first translational stiffness $k_1$ and the second translational stiffness $k_2$ is at least 10:1, particularly at least 100:1.

In certain embodiments, the third flexure has a second translational stiffness $k_2=F/\delta$ of at least $10^4$ N/m, particularly $10^4$ N/m to $10^5$ N/m in respect of a displacement along the longitudinal axis.

In certain embodiments, the rotational shear rheometer comprises an adjusting element, particularly comprising an adjusting screw, for adjusting a position and/or a prestress of the piezoelectric element along the longitudinal axis, wherein particularly the adjusting element is connected to the third flexure, wherein the adjusting element is configured to adjust the position and/or the prestress by adjusting the position of the third flexure along the longitudinal axis.

In certain embodiments, the piezoelectric element comprises a plurality of piezoelectric plates stacked along the longitudinal axis, wherein particularly the piezoelectric plates are sintered together. In particular, the plates each extend in a plane perpendicular to the longitudinal axis and are parallel to each other.

A stack of piezoelectric plates increases the force sensitivity of the piezoelectric element. In addition, in case the plates are sintered together rather than glued, operation temperatures up to about 200° C. can be applied without destruction of the piezoelectric element.

Therefore, the mechanical properties of many polymers can be analyzed above their glass transition temperature using the device according to the invention.

In certain embodiments, the piezoelectric element and the first flexure each comprise a respective translational stiffness in respect of a displacement along the longitudinal axis, wherein a ratio between the translational stiffness of the piezoelectric element and the translational stiffness of the first flexure is at least 10:1, particularly at least 100:1.

This advantageously allows the deformation of the piezoelectric element to be transduced to the first plate also when periodic displacements are introduced at a relatively high frequency (e.g. 20 Hz or more).

In certain embodiments, the rotational shear rheometer comprises a first holding element and a second holding element for holding the piezoelectric element, particularly between the second flexure and the third flexure.

In particularly, the first holding element and/or the second holding element is a beam or a plate.

In particular, the connections of the piezoelectric element to the adjacent components of the rheometer are stiff towards transitions and rotations along the longitudinal axis, but allow all other deformations to reduce stress (e.g. parasitic stress) to the piezoelectric element.

In certain embodiments, the first holding element comprises a first recess and the second holding element comprises a second recess, wherein the first end of the piezoelectric element comprises a first protrusion for engaging (or being inserted into) the first recess, and wherein the second end of the piezoelectric element comprise a second protrusion for engaging (or being inserted into) the second recess, wherein particularly the first and the second protrusion and the first and the second recess have a spherical shape.

In certain embodiments, the first holding element is connected to the piezoelectric element by means of a first joint, and the second holding element is connected to the piezoelectric element by means of a second joint, wherein the first and the second joint are pivotable about the pivot axis, the longitudinal axis and a further axis which is perpendicular to the pivot axis and the longitudinal axis.

In certain embodiments, the rotational shear rheometer comprises a second plate or a cone, wherein the first plate and the second plate or the first plate and the cone form a gap for receiving a sample, wherein the gap particularly extends along the pivot axis.

The movable first plate of the rheometer can be combined with different (particularly stationary) reflectors, such as plates (plate-plate configuration) or cones (plate-cone or Couette configuration).

In certain embodiments, the rotational shear rheometer comprises a temperature controller for controlling the temperature of a sample in a gap between the first plate and a second plate or cone, wherein particularly the temperature controller is configured to set a temperature of 10° C. to 200° C., particularly 10° C. to 150° C.

In certain embodiments, the rotational shear rheometer comprises at least one strain gauge attached to the piezoelectric element, particularly to at least one side of the piezoelectric element, wherein the at least one strain gauge is configured to measure the deformation of the piezoelectric element along the longitudinal axis separately from the measurement of the torque or force acting on the first plate due to the shear deformation of the sample or separately from the measurement of the additional current generated by the piezoelectric element due to the torque or the force acting on the first plate.

In certain embodiments, the rotational shear rheometer comprises an active feedback loop configured to control an output deformation of the piezoelectric element and/or configured to reduce a creep in the applied deformation or in the measured additional current generated by the piezoelectric element due to the torque or the force acting on the first plate.

A second aspect of the invention relates to a method for determining mechanical properties of a sample using the rotational shear rheometer according to the first aspect of the invention, wherein a sample is provided in a gap between the first plate and a second plate or a cone, a voltage is applied to the piezoelectric element, such that the piezoelectric element extends or undergoes compression along the longitudinal axis, resulting in a pivoting motion of the first plate about the pivot axis with respect to the support, wherein a shear deformation is introduced to the sample, a torque or a force exerted on the first plate by the sample due to the shear deformation is determined by the piezoelectric element.

In certain embodiments, an alternating voltage is applied to the piezoelectric element, such that the piezoelectric element periodically extends and undergoes compression, resulting in an oscillating pivoting motion of the first plate with respect to the support and an oscillating shear deformation in the sample.

In certain embodiments, an alternating voltage which alternates around a positive offset voltage is applied to the piezoelectric element, such that the piezoelectric element periodically extends, wherein particularly the offset voltage is equal to or larger than an amplitude of the alternating voltage.

In certain embodiments, an alternating voltage which alternates around a negative offset voltage is applied to the piezoelectric element, such that the piezoelectric element periodically compresses, wherein particularly the absolute value of the offset voltage is equal to or larger than the absolute value of an amplitude of the alternating voltage. Such an alternating voltage applied over an offset voltage is favorable particularly for larger deformations and when the piezoelectric element is clamped between structures such as the second and third flexure.

In certain embodiments, the alternating voltage is characterized by a frequency of at least 10 Hz, particularly at least 20 Hz, more particularly resulting in an oscillating pivoting motion of the first plate at the same frequency.

In certain embodiments, the frequency of the alternating voltage is 10 Hz to 5000 Hz, particularly 20 Hz to 2500 Hz.

In certain embodiments, the total input voltage applied to the piezoelectric element is controlled.

In certain embodiments, a torque or a force acting on the first plate due to the shear deformation of the sample is detected by the piezoelectric element.

In certain embodiments, an additional current generated by the piezoelectric element due to the torque or the force acting on the first plate is determined.

In certain embodiments, the additional current generated by the piezoelectric element is determined by measuring an amplitude of a first output current of the piezoelectric element in the absence of a sample (i.e. with an empty gap between the first plate and the second plate or cone), measuring an amplitude of a second output current of the piezoelectric element in the presence of a sample (i.e. with a sample between the first plate and the second plate or cone), and determining a difference or a ratio between the amplitude of the first output current and the amplitude of the second output current.

In certain embodiments, a phase shift of the oscillating shear deformation is determined by measuring a first output current of the piezoelectric element in the absence of a sample (i.e. with an empty gap between the first plate and the second plate or cone), measuring a second output current of the piezoelectric element in the presence of a sample (i.e. with a sample between the first plate and the second plate or cone), and determining a phase angle difference between the first output current and the second output current.

In certain embodiments, a deformation of the piezoelectric element is measured separately from the measurement of the torque or force acting on the first plate due to the shear deformation of the sample or separately from the measurement of the additional current generated by the piezoelectric element due to the torque or the force acting on the first plate. This advantageously enhances sensitivity of the rheological measurement.

In certain embodiments, the output current of the piezoelectric element is amplified, particularly by a Lock-in amplifier.

In certain embodiments, the mechanical properties of the sample are determined within the gap loading limit.

Within the context of the present specification the term 'gap loading limit' describes conditions where the wavelength of a shear wave generated in the sample by the oscillating shear deformation is long compared to the size of the gap. Under these circumstances, the shear wave travels across the gap and is reflected by the second plate or cone before it is attenuated or damped.

In certain embodiments, the gap between the first plate and the second plate or the first plate and the cone measures 10 µm to 500 µm, particularly about 200 µm, along the pivot axis.

In certain embodiments, the method is performed at a temperature of 150° C. or more, particularly wherein the sample is a polymer melt.

In certain embodiments, a maximum deformation amplitude of the sample in the gap between the first plate and the second plate or the cone is 1 µm or less.

Wherever alternatives for single separable features are laid out herein as "embodiments", it is to be understood that such alternatives may be combined freely to form discrete embodiments of the invention disclosed herein.

The invention is further illustrated by the following examples and figures, from which further embodiments and advantages can be drawn. These examples are meant to illustrate the invention but not to limit its scope.

Figure 1:
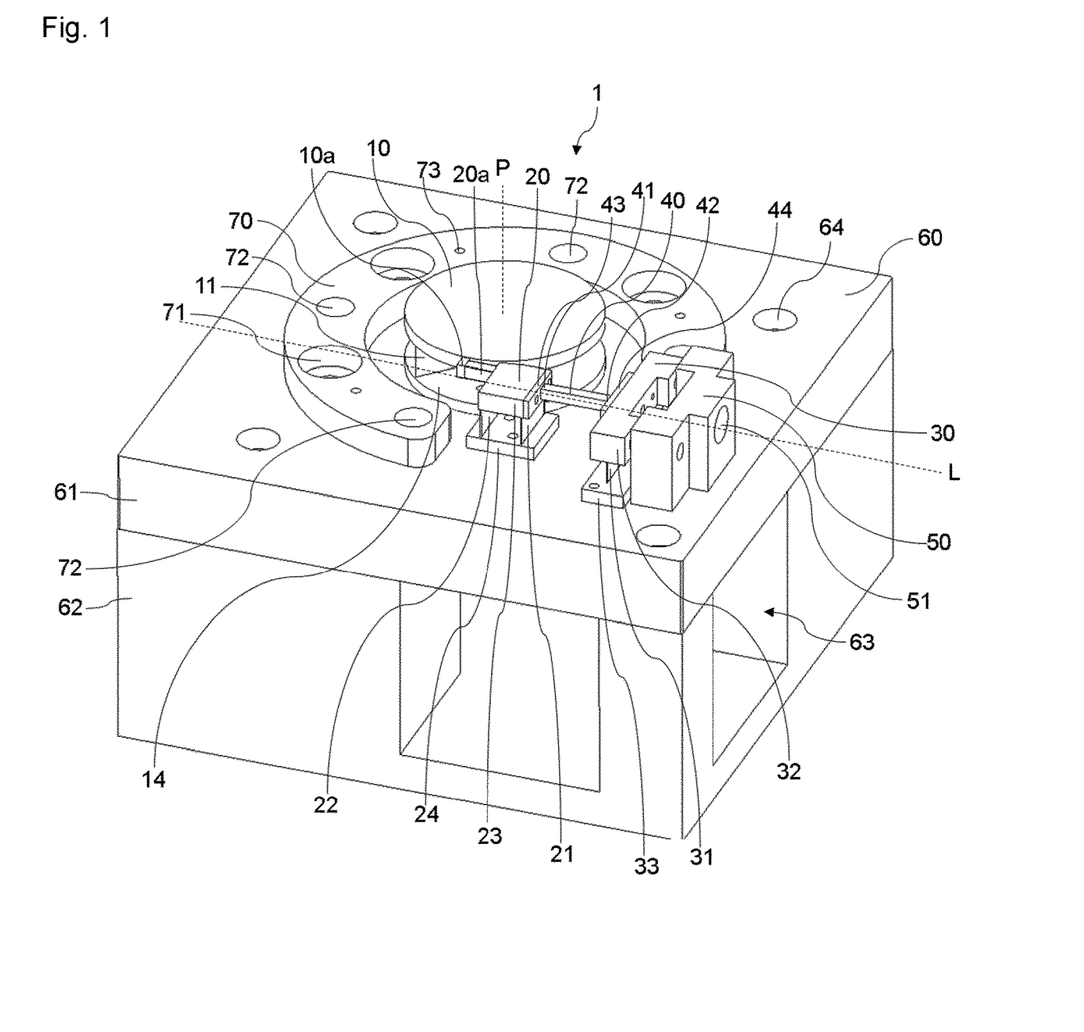
FIG. 1 shows a perspective view of a first embodiment of the rotational shear rheometer according to the invention.

FIG. 1 shows a perspective view of a rotational shear rheometer 1 according to the invention comprising a first plate 10, a first flexure 11, a second flexure 20, a piezoelectric element 40, and a third flexure 30. The components of the rotational shear rheometer 1 are arranged on and fixed to a support 60 comprising a support plate 61 and a support base 62 connected to the support plate 61. The support plate 61 comprises through holes 64 for inserting screws or bolts to fix the support plate 61 to the support base 62. Furthermore, the support base 62 comprises a cavity 63, such that the support plate 61 is accessible from below via the cavity 63, particularly to install components of the rheometer 1 on the support plate 61.

The first plate 10 is pivotally coupled to the support plate 61 by the first flexure 11 and a base 14, wherein the base 14 is connected to the support plate 61 and the first flexure 11 is connected to the base 14 and the first plate 10, such that the first plate 10 can be pivoted about a pivot axis P at least by a small angle due to the rotationally flexible first flexure 11.

The piezoelectric element 40 is configured to elongate and/or undergo compression along a longitudinal axis L perpendicular to the pivot axis P when an electric field is generated across the piezoelectric element 40 by applying a voltage to the piezoelectric element 40.

FIG. 2A-F illustrate details of the first plate 10 and the first flexure 11. Therein, FIG. 2A is a perspective view of the assembly of plate 10, first flexure 11 and base 14, FIG. 2B is a top view of the plate 10, FIG. 2C is a side view of the assembly, FIG. 2D is a section along the cutting line C indicated in FIG. 2C, perpendicular to the pivot axis P, FIG. 2E shows detail A indicated in FIG. 2B, and FIG. 2F illustrates detail B indicated in FIG. 2C.

The first plate 10 has a circular cross-section perpendicular to the pivot axis P, with the pivot axis P intersecting the center of the circle, which is also the center of mass of the first plate 10 (see perspective view of FIG. 2A, showing the pivot axis P).

As best seen in FIG. 2D, the first flexure 11 is cross shaped or X shaped, consisting of a first flexural element 12 extending along a length I perpendicular to the pivot axis P and a second flexural element 13 extending along a length I perpendicular to the pivot axis P. The first flexural element 12 and the second flexural element 13 intersect with each other and with the pivot axis P at the center of mass of the first plate 10 and confine an angle of 90° between them, resulting in an X shape. The first flexural element 12 and the second flexural element 13 further comprise a height h extending along the pivot axis P and a thickness t perpendicular to the length I and to the height h (see FIGS. 2C and 2D).

The first plate 10 further comprises a radial extension 10a extending radially from the circumference of the first plate 10, which is shown in detail in FIGS. 2E and F. the radial extension 10a comprises a through hole 10b extending along the longitudinal axis L shown in FIG. 1.

As best seen in FIG. 2D, the base 14 comprises through holes 16 for fixing the base 14 to the support plate 61 of the support 60 shown in FIG. 1, e.g., by suitable screws or bolts.

Details of the second flexure 20 are depicted in FIG. 3A-D, wherein FIG. 3A is a perspective view of the second flexure 20, FIG. 3B is a side view of the second flexure 20 viewed along the longitudinal axis L, FIG. 3C is a front view showing a projection perpendicular to the longitudinal axis L, and FIG. 3D is a top view of the second flexure 20.

The second flexure 20 comprises a base 24 connected to the support plate 61 (see FIG. 1), a third flexural element 21 and a fourth flexural element 22 connected to the base 24 at their respective bottom ends 21a, 22a. The third flexural element 21 and the fourth flexural element 22 are connected to a joining element 23 at their respective top ends 21b, 22b. The joining element 23 is connected to a longitudinal extension 20a extending along the longitudinal axis L (see FIG. 3B, 3D), wherein the longitudinal extension 20a comprises a through hole 20b extending along the longitudinal axis L.

The third flexural element 21 and the fourth flexural element 22 each extend along a respective length I perpendicular to the longitudinal axis L, along a respective height h parallel to the pivot axis P (see FIG. 1), and have a respective thickness t perpendicular to the respective length I and the respective height h.

Figure 4:
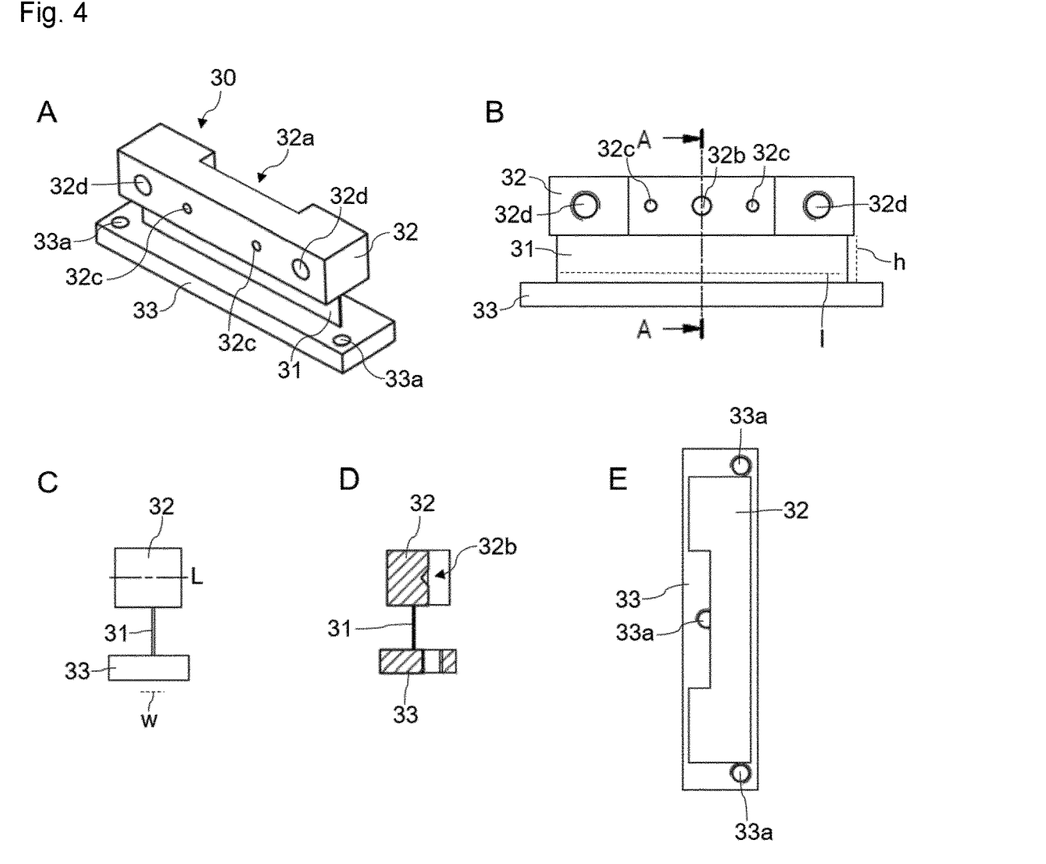
FIG. 4 shows different views of a third flexure of a rheometer according to the invention.

FIG. 4A-E illustrate details of the third flexure 30, wherein FIG. 4A is a perspective view, FIG. 4B is a front view showing a projection perpendicular to the longitudinal axis L, FIG. 4C is a side view showing a projection along the longitudinal axis L, FIG. 4D is a sectional view along the cutting line A indicated in FIG. 4B, and FIG. 4E is a top view showing a projection perpendicular to the pivot axis P (see FIG. 1).

The third flexure 30 comprises a base 33 connected to the support plate 61 shown in FIG. 1, a fifth flexural element 31 connected at its bottom end to the base 33 and connected at its top end to a joining element 32.

The fifth flexural element 31 extends along a length I perpendicular to the longitudinal axis L and along a height h parallel to the pivot axis P (see FIG. 1) and comprises a thickness t perpendicular to the length I and the height h. Hence, the fifth flexural element 31 is arranged parallel to the third flexural element 21 and the fourth flexural element 22 of the second flexure 20 (see FIG. 1).

As best seen in FIG. 4A and FIG. 4E, the joining element 32 comprises a cube shaped recess 32A. Arranged in the center of the recess 32a, the joining element 32 comprises a circular opening 32b extending along the longitudinal axis L. In addition, first through holes 32c extending along the longitudinal axis L are arranged in the joining element 32 on either side of the opening 32b in the recess 32a and second through holes 32d extending along the longitudinal axis L are arranged in the joining element 32 laterally to the recess 32a.

The base 33 of the third flexure 30 further comprises through holes 33a extending along the pivot axis P for fixing the base 33 to the support plate 61 (see FIG. 1).

Figure 2:
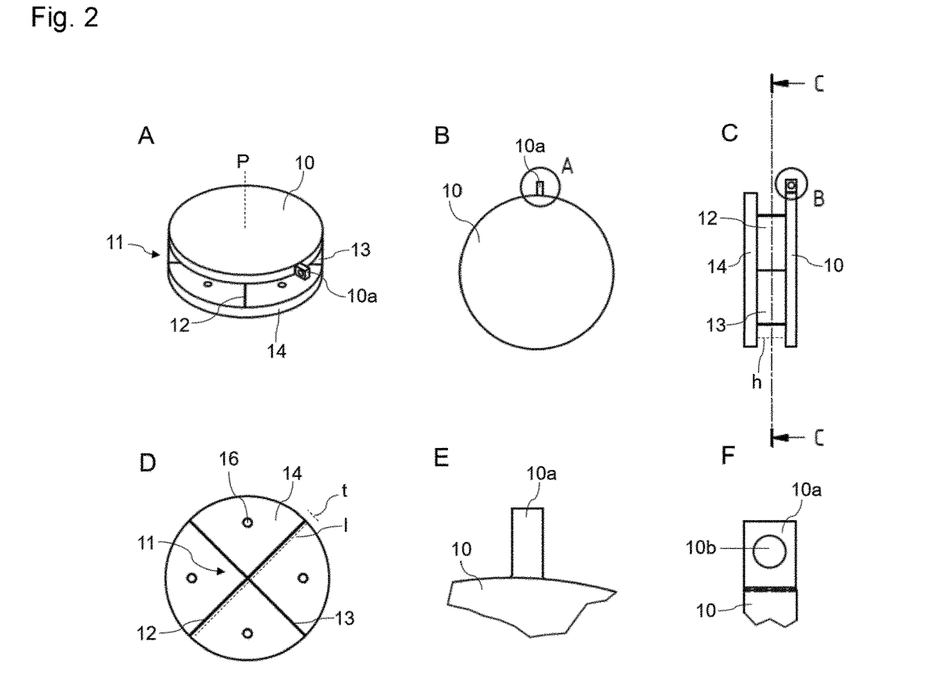
FIG. 2 shows different views of a first plate and first flexure of a rheometer according to the invention.
Figure 3:
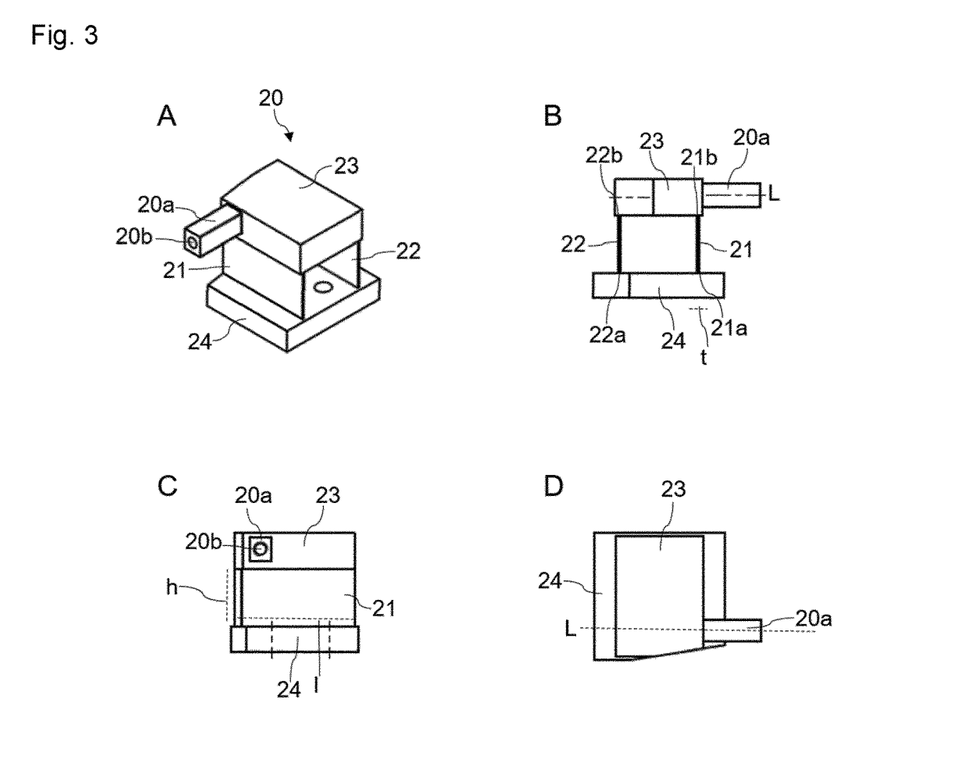
FIG. 3 shows different views of a second flexure of a rheometer according to the invention.

As shown in FIG. 1, the longitudinal extension 20a of the second flexure 20 is connected to the radial extension 10a of the first plate 10, particularly by a screw or bolt extending through the through hole 10b of the radial extension 10a and the through hole 20b of the longitudinal extension 20a (see FIGS. 2 and 3). In this manner, the second flexure 20 is mechanically coupled to the first plate 10 such that a translational movement of the second flexure 20 along the longitudinal axis L is converted to a pivoting motion of the first plate 10 about the pivot axis P.

The piezoelectric element 40 is held between a first holding element 43 which is connected to the joining element 23 of the second flexure 20 and a second holding element 44, which is connected to the joining element 32 of the third flexure 30. In the depicted embodiment, the piezoelectric element 40 is clamped between the first holding element 43 and the second holding element 44, wherein a first end 41 of the piezoelectric element 40 is in contact with the first holding element 43, and a second end 42 of the piezoelectric element 40 is in contact with the second holding element 44. The first holding element 43 is particularly connected to the joining element 23 by bolts or screws, inserted into openings (particularly having an internal thread) of the joining element 23 not shown in FIG. 3, and the second holding element 44 is particularly connected to the joining element 32 by bolts or screws inserted into second through holes 32d, particularly having an internal thread (see FIG. 4B). Thereby, the piezoelectric element 40 is tightly fixed between the second flexure 20 and the third flexure 30, such that when the piezoelectric element 40 expands or undergoes compression along the longitudinal axis L, the resulting translational movement is transferred via the second flexure 20, the longitudinal extension 20a and the radial extension 10a and converted into a pivoting motion of the first plate 10 about the pivot axis P without inducing bending moments.

Figure 5:
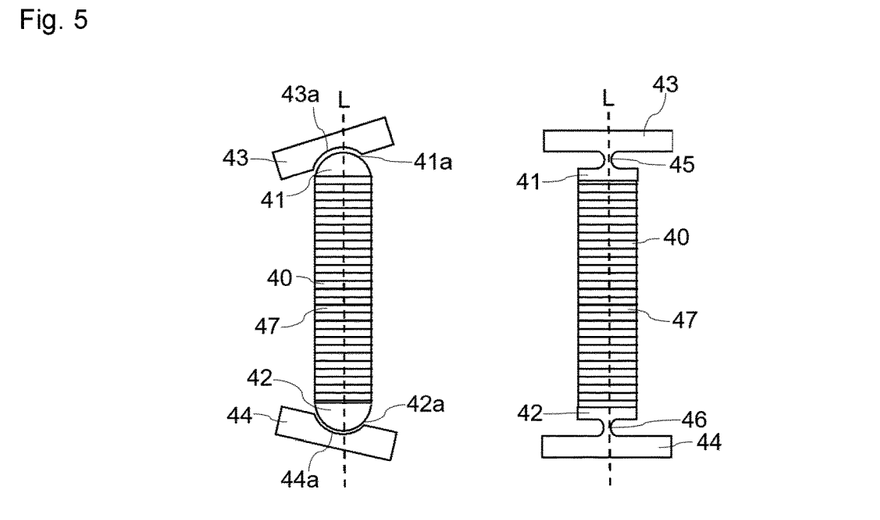
FIG. 5 shows piezoelectric elements and holding elements of a rheometer according to the invention for reducing parasitic stresses.

Embodiments of the piezoelectric element 40 are depicted in FIG. 5. The piezoelectric element 40 is particularly a stack of piezoelectric plates 47 arranged along the longitudinal axis L, which are particularly sintered together to increase the temperature range of operation.

According to the embodiment shown in FIG. 5A, the piezoelectric element 40 comprises spherical (i.e., having the shape of a sphere or a segment of a sphere) protrusions 41a, 42a at a first end 41 and a second end 42, respectively, and the first holding element 43 configured to hold the first end 41 and the second holding element 44 configured to hold the second end 42 comprise corresponding recesses 43a, 44a. When the piezoelectric element 40 is tightly fixed between the first holding element 43 and the second holding element 44, the protrusions 41a, 42a engage into the corresponding recesses 43a, 44a.

FIG. 5B shows an embodiment of the piezoelectric element 40 where the first end 41 and the second end 42 of the piezoelectric element 40 are respectively coupled to the first holding element 43 and the second holding element 44 by joints 45, 46.

The connections shown in FIG. 5 are especially stiff towards transitions and rotations along the longitudinal axis L, but allow all other deformations to reduce parasitic stresses to the piezoelectric element 40.

As further depicted in FIG. 1, at the side of the third flexure 30 opposite the piezoelectric element 40, an adjusting element 50 connected to the support plate 61 for adjusting the position of the third flexure 30 is positioned. The adjusting element 50 comprises a central through hole 51 extending along the longitudinal axis L, wherein the through hole 51 particularly comprises an internal thread configured to receive an adjusting screw (not shown) that contacts the joining element 32 of the third flexure 30 to adjust the position of the piezoelectric element 40 along the longitudinal axis L and particularly apply a pre-stress to the piezoelectric element 40.

Figure 6:
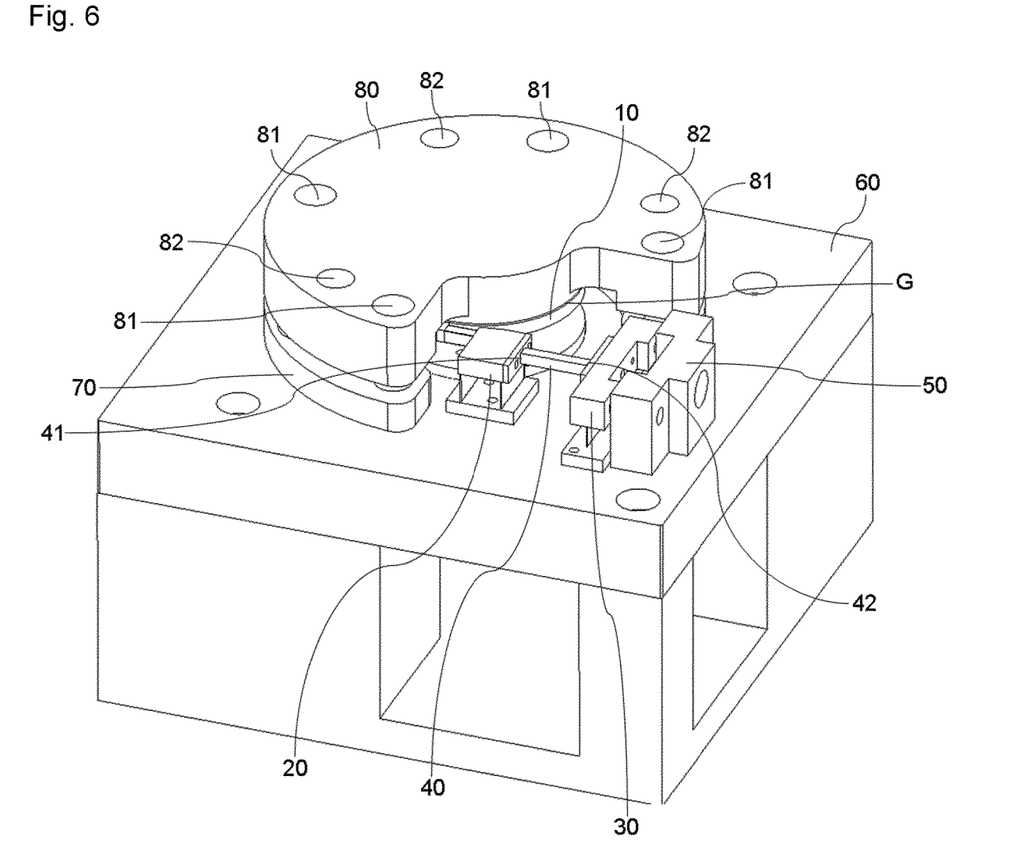
FIG. 6 shows a perspective view of the rotational shear rheometer shown in FIG. 1 with an additional second plate forming a gap with the first plate.

Around the circumference of the first plate 10 and first flexure 11, a ring element 70 for arranging and fixing a second plate 80 (see FIGS. 6 and 7) or a cone 90 (see FIG. 7) is disposed with an opening of the ring to accommodate the second flexure 20, piezoelectric element 40 and third flexure 30. The ring element 70 comprises first through holes 71 for inserting screws or bolts to fix the ring element 70 to the support plate 61. The ring element 70 further comprises second through holes 72 for fixing the second plate 80 to the ring element 70 via screws or bolts extending through first through holes 81 of the second plate 80 (see FIG. 6) and the second through holes 72 of the ring element 70. In this manner, the second plate 80 or cone is fixed to the support 60, such that the first plate 10 may pivot in respect of the second plate 80 or cone, while the second plate 80 or cone remains stationary. Thus, a shear deformation of a sample in the gap G between the first plate 10 and the second plate 80 or cone can be induced.

In addition, the ring element 70 comprises third through holes 73 for introducing adjustment screws through second through holes 82 of the second plate 80 (see FIG. 6) and the third through holes 73 in order to adjust the size of a gap G (see FIG. 6) between the first plate 10 and the second plate 80 or cone.

For rheological measurements using the rheometer 1 according to the invention, a second plate 80 or a cone 90 is placed on the first plate 10, such that a gap G is formed between the first plate 10 and the second plate 80 or between the first plate 10 and a cone 90, and a sample is arranged in the gap G. subsequently, the first plate 10 is particularly pivoted periodically, e.g., at a frequency of 20 Hz to 3 kHz, by applying a voltage to the piezoelectric element 40, thereby introducing a periodic shear deformation to the sample. The torque or force on the first plate 10 resulting from this shear deformation of the sample is monitored by the piezoelectric element 40, which is hence used both as an actuator and as a sensor.

Figure 7:
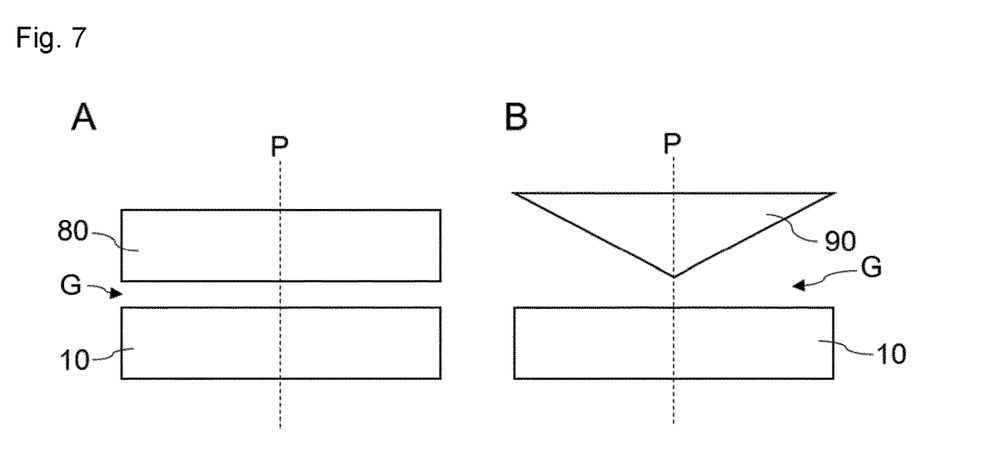
FIG. 7 shows schematics of plate-plate (A) and plate-cone (B) configurations of rotational shear rheometers.

FIG. 7 is a schematic representation of a plate-plate configuration (FIG. 7A, similar to the configuration shown in detail in FIG. 6) and a plate-cone configuration (FIG. 7B, also termed Couette configuration) showing the gap G.

Figure 8:
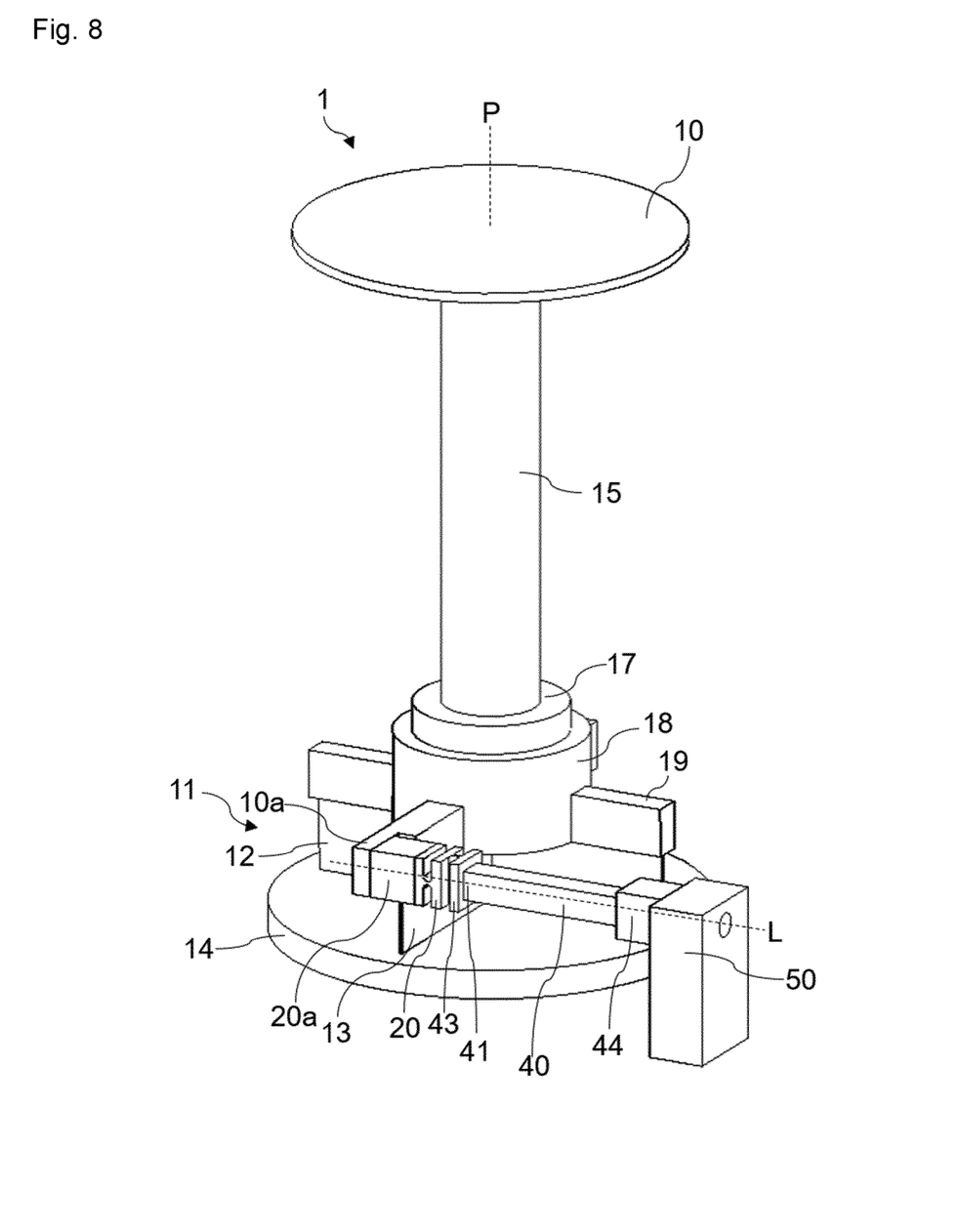
FIG. 8 shows a perspective view of a second embodiment of the rotational shear rheometer according to the invention.

FIG. 8 shows a further embodiment of the rotational shear rheometer 1 according to the invention, which is particularly adapted to perform rheological measurements at high temperature in an oven cell and in combination with a commercial instrument.

The rheometer 1 comprises a first plate 10 for arranging a sample in a gap between the first plate 10 and a second plate or a cone (see for instance FIG. 7). The first plate 10 is coupled to a first flexure 11 by means of a shaft 15, which is rigidly connected to an inner ring 17, in turn being rigidly connected to an outer ring 18 of the first flexure 11. Four spokes 19 extending in a radial direction in respect of the pivot axis P are arranged at angles of 90° around the circumference of the outer ring 18.

The first flexure 11 comprises a first flexural element 12 and a second flexural element 13 arranged radially in respect of the pivot axis P, wherein the first flexural element 12 and the second flexural element 13 intersect with each other and the pivot axis P, resulting in a cross shape or X-shape with an angle of 90° between the first flexural element 12 and the second flexural element 13. A respective bottom end of the first flexural element 12 and the second flexural element 13 is connected to circular base 14, which may be arranged on and connected to a support similar to the setup depicted in FIG. 1. The respective top ends of the first flexural element 12 and the second flexural element 13 are connected to the outer ring 18 and the spokes 19.

One of the spokes 19 comprises a radial extension 10a connected to a longitudinal extension 20a of the second flexure 20. The second flexure 20 is coupled to a first holding element 43 which is in turn connected to a first end 41 of a piezoelectric element 40 extending along a longitudinal axis L and held in place between the first holding element 43 and a second holding element 44 which is connected to an adjusting element 50 configured to adjust the position and particularly a pre-stress to the piezoelectric element 40 along the longitudinal axis L.

When the piezoelectric element 40 expands or undergoes compression along the longitudinal axis L, the second flexure 20 is displaced along the longitudinal axis L and this displacement is converted into a pivoting motion of the first flexure 11 about the pivot axis P via the radial extension 10a. The pivoting motion is transduced to the first plate 10 via the shaft 15, such that a sample arranged in a gap between the first plate 10 and the second plate or cone undergoes a shear deformation. The piezoelectric element 40 is further used as a sensor to detect the torque or force applied to the first plate 10 resulting from the shear deformation of the sample.

Due to its long shaft 15, the first plate 10 is physically separated from the piezoelectric element 40 and flexure assembly and can be placed in an oven without damaging the piezoelectric element 40 and flexure assembly.

EXAMPLE

FIG. 10-14 illustrate results from measurements of an exemplary rotational shear rheometer according to the invention using a PICMA P-883.51 longitudinal piezoelectric stack (3 mm×3 mm×18 mm, PI Ceramic) with sintered piezoelectric plates as a piezoelectric element 40. The flexural elements 12, 13, 21, 22, 31 were made out of Titanium and had a thickness of about 250 µm. The piezoelectric element 40 had spherical ends, and the first and second holding elements 43, 44 comprised recesses 43a, 44a, into which the spherical ends were inserted. The position of the third flexure 30 as well as the clamping force on the piezoelectric element was controlled by an adjustment screw (AJS127-02H, Newport) and fixed with two screws.

The diameter of the first plate was 50 mm. Gap setting and alignment was carried out mechanically by 3 displacement sensors (SC-2440, Kaman) and 3 precision adjustment screws (AJS127-0.5H, Newport) with an overall precision of about 1 µm. The gap size was 200 µm along the pivot axis and was set by four fixation screws with a fine thread to avoid resonances. The elements of the rheometer were screwed to a support plate resting on a passive anti-vibration table.

Measurement Principle Piezoelectric Elements

Piezoelectric materials accumulate an electric charge in response to an applied stress, or deform in response to an applied electric field. The governing equations can be written in the strain-charge form as:

$$\varepsilon = s_{33}\Sigma + d_{33}^T T, \quad (1)$$

$$D_E = \varepsilon E + d_{33}\Sigma, \quad (2)$$

E is the applied electric field, $D_E$ the electric displacement field, $\varepsilon$ the permittivity and $\varepsilon$ and $\Sigma$ respectively the stress and strain tensors. The coefficients $s_{33}$ and $d_{33}$ are the mechanical compliance and piezoelectric coupling coefficients in the thickness direction. Hence, from equation 2, it follows that an external mechanical load increases the electric displacement field inside the piezoelectric stack. The contributions from electrical and mechanical origin are additive, and the mechanical response can be determined from the difference with an unloaded cell.

Signal Analysis and Electrical Response

Signal Analysis and Electronic Scheme

Figure 9:
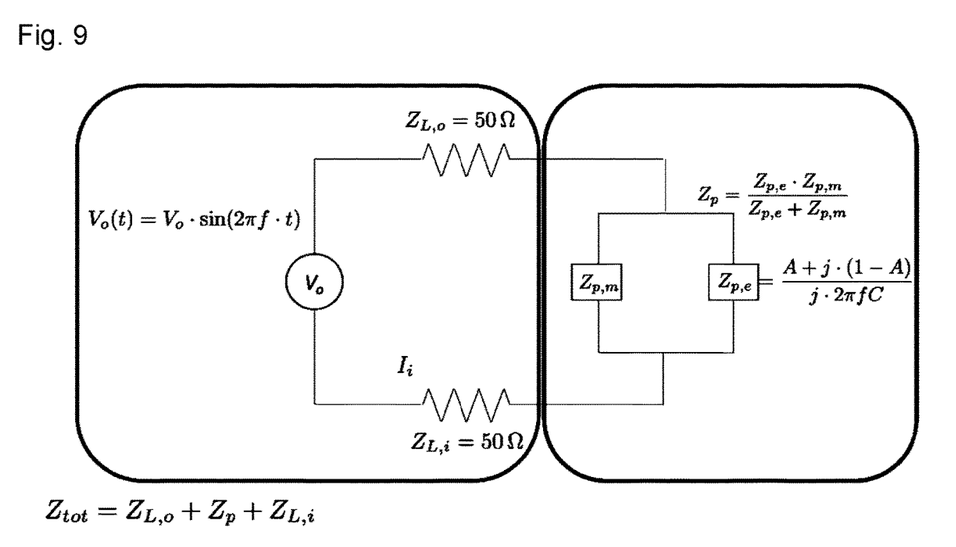
FIG. 9 shows a circuit diagram of an electronic circuit used for measurements with the rheometer according to the invention.

FIG. 9 shows a schematic of the electronic circuit. A digital Lock-in amplifier (MFLI, Zurich Instruments) was used to generate the signal and analyse the response. The setup is voltage controlled; the resulting current originating from electrical and mechanical contributions is analysed. Equations 1-2 can then be rewritten as:

$$z_p = d_{33}V_p - \frac{F_m}{k_p}, \quad (3)$$

$$I_p = \frac{V_p}{Z_{p,e}} + j2\pi f d_{33} F_m, \quad (4)$$

$z_p$ is the longitudinal displacement of the piezoelectric stack, $V_p$ and $I_p$ are the voltage over and total current through the piezo. $F_m$ is the mechanical force acting on the stack and $k_p$ (about $10^7$ N/m) is its stiffness. From equation 3, it can be seen that the deformation of the stack is nearly unaffected as long as its stiffness is substantially higher than $k_m$, the stiffness of the mechanical load ($F_m = k_m z_p$). Electrical and mechanical contributions are additive with respect to the current (equation 4) and are hence placed in parallel (FIG. 9, $Z_{p,e}$; $Z_{p,m}$).

Response Electronics

Figure 10:
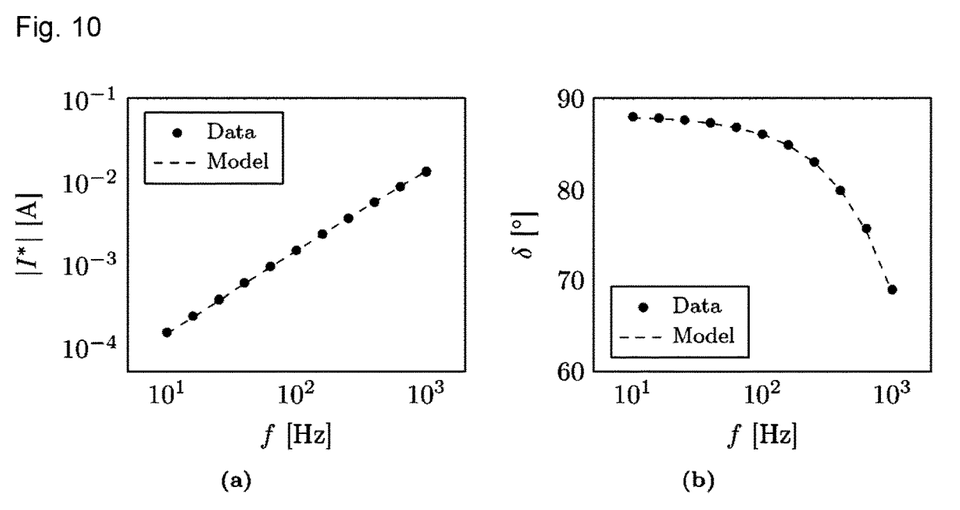
FIG. 10 shows the amplitude (A) and phase (B) response of the electronic circuit shown in FIG. 9 without mechanical loading.

Before interpreting the mechanical response of the flexural elements and of a loaded sample, an analysis of the response of the electronics was performed. FIG. 10 shows the output current (amplitude and phase) for a control voltage amplitude $V_o = 4$ V. The piezo was resting in the spherical indentations without being clamped and is, mechanically, quasi unloaded. The total impedance of the circuit is therefore:

$$Z_{tot} = Z_{L,o} + Z_p + Z_{L,i} \approx Z_{L,o} + Z_{p,e} + Z_{L,i}, \quad (5)$$

as shown in FIG. 9, with $Z_{L,o} = Z_{L,i} = 50\Omega$. The electrical impedance of the piezoelectric stack is mostly capacitive. However, small conversion losses up to ~2% can be present. The impedance is therefore modelled by $$Z_{p,e} = \frac{A + j(1 - A)}{j2\pi f C},$$

with C the capacitance and A a constant factor representing the losses. FIG. 10 compares the data with the model fit, fitting both $C = 5.53 \cdot 10^{-7}$ F and $A = 0.968$, which are close to the values specified by the manufacturer.

FIG. 10 illustrates that the response of the electronic circuit can be interpreted well with the model transfer function. Nonetheless, small differences are present with the actual data. Since the mechanical response of the flexural elements needs to be determined by subtracting the electronic contribution from the measurement, these small differences are important. A second difficulty that was monitored was the presence of a creep, logarithmic over time, of the measured signal under oscillatory deformation. The drift could be either negative or positive, depending on the previous amplitude value, ruling out a potential effect from internal heating, and was present with or without mechanical loading.

Without wishing to be bound by theory, it is believed that this is an effect of operating the actuator in an open loop circuit. Since the creep changes the actuator properties up to a few % over time, it requires in this case an empirical determination of properties of a mechanical load.

Mechanical Response Flexural Elements

Model Mechanical Elements

As a second step, the response of the assembled system with the flexural elements present was determined by clamping the piezoelectric stack tightly between the two stacks without loading a sample. Before reaching any inertial effects at higher frequencies, these flexures are expected to behave mainly as springs. The mechanical load on the piezoelectric stack was simulated using COMSOL, predicting a combined stiffness of both flexural elements $k_f=3.36 \cdot 10^5$ N/m. The current can then be decomposed in an electrical and mechanical component, depending on the stiffness of the mechanical load km, (equation 4) as:

$$I_p = I_{p,e} + I_{p,m} = \frac{V_p}{Z_{p,e}} + j2\pi f d_{33} \cdot k_m z_p, \quad (6)$$

with $$z_p = \frac{d_{33} V_p}{1 + k_m/k_p} \quad \text{(equation 3)}$$

depending on the load as well. The properties of an unknown mechanical load must therefore be determined via the difference between $I_p$-$I_{p,e}$. As an illustration, FIG. 11 displays $|I_m^*|/|I^*|$, the ratio of the current amplitude generated by a mechanical load to the total current amplitude, as a function of $k_m$. The plot shows that with the used piezoelectric stack and Lock-in amplifier, with a 16-bit resolution, the minimum detectable load is ~$10^3$ N/m. The calculated stiffness of the combined flexural elements $k_f$ is well above this limit. The curve starts to flatten when $k_m$ approaches $k_p$.

Response Flexural Elements

The mechanical force on and displacement of the piezo $F_m$ and $z_p$ are determined from the measured current $I_{L,i}$ via equations 3-4, with $V_p=V_o-I_{L,i} \cdot (Z_{L,o}, +Z_{L,i})$ (equation 5):

$$F_m = \frac{1}{j2\pi f d_{33}} \left[ I_{L,i} - \frac{1}{Z_{p,e}} (V_o - I_{L,i} \cdot (z_{L,o} + z_{L,i})) \right], \quad (7)$$

$$z_p = d_{33}(V_o - I_{L,i} \cdot (Z_{L,o} + Z_{L,i})) - \frac{F_m}{k_p}, \quad (8)$$

Figure 11:
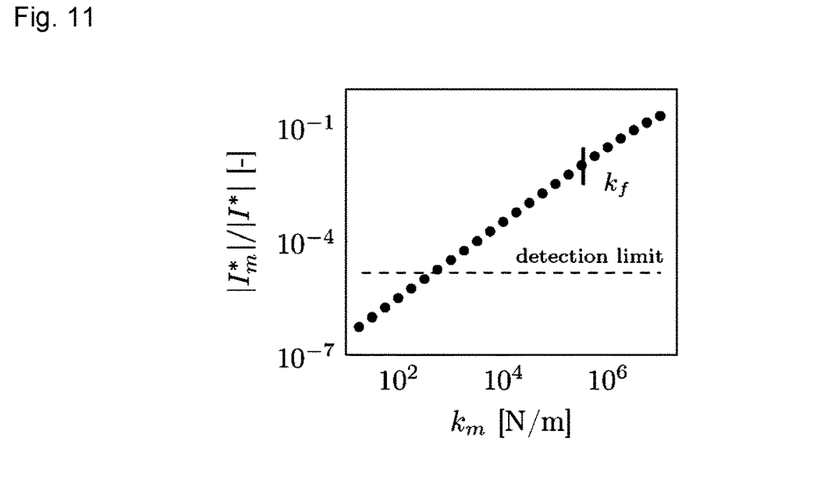
FIG. 11 shows the calculated ratio of the current amplitude generated by a mechanical load applied to the rheometer of the invention to the total current amplitude as a function of the mechanical stiffness.
Figure 12:
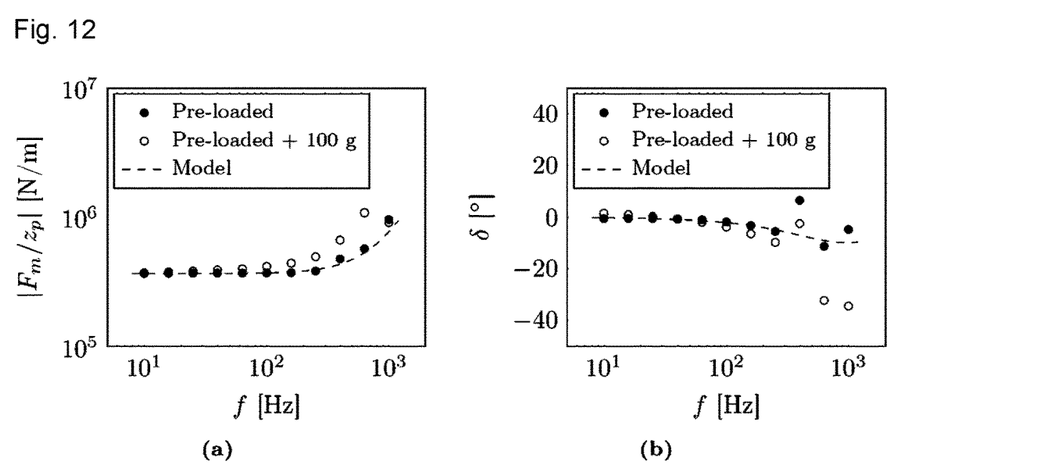
FIG. 12 shows the response of the flexures of the rheometer according to the invention with or without an added mass of 100 g.

Zp;e was determined empirically by fitting each data point from FIG. 10, and the aforementioned creep was corrected for by determining a creep curve from consecutive sweeps. FIG. 12 displays the magnitude and phase of the amplitude ratio (AR) $F_m/z_p$. As expected, the flexural elements behave like springs at low frequencies with a constant AR and $\delta \approx 0$. The setup with clamped piezoelectric stacks did not show noticeable resonances below 1 kHz. However, the electronic response was determined for an unclamped, freely moving element that did resonate >400 Hz, which result in a scattered AR at these frequencies as well (e.g. $\delta$ at 400 Hz). The response was fitted with a $2^{nd}$ order mechanical model:

$$\frac{F_m}{z_p} = k + \zeta 2\pi f - m(2\pi f)^2 \quad (9)$$

with a stiffness $\zeta$ damping and mass m. The fitted stiffness $k=3.67 \cdot 10^5$ N/m of the flexural elements was similar to the calculated stiffness $k_f$ using COMSOL (FIG. 11). As detection of the Lock-in amplifier is limited [0;180°], care needed to be taken with respect to the exact nature of the phase angle measured. The current resulting from the mechanical load on the piezoelectric element is shifted with 90° (equation 4), resulting in negative damping and inertial terms. The response when adding additional inertia by means of a 100 g mass deviates from the response of a spring at lower frequencies already (FIG. 12), proving that the higher order effects are responsible for the monitored behaviour.

Results

The setup was validated using 3 different standards: Brookfield 100 and Brookfield 12 standards and the NIST viscoelastic standard (11.4 wt % Polyisobutylene [PIB, CAS No. 9003-27-4 in pristane [CAS No. 1921-70-6]). Measurements were carried out at room temperature. Since the piezoelectric properties slowly creeped with time, derived models for the electronics and flexural elements could not be used to determine viscoelastic properties from the raw current data. Instead, properties were derived empirically, using equation 4 and assuming that the mechanical loads of the flexures and sample are additive:

$$I - I_{empty} = \frac{j2\pi f d_{33} \cdot F_s}{1 + \frac{1}{z_{p,e}}(Z_{L,0} + Z_{L,i})} \quad (10)$$

$I_{empty}$ is the response of the setup without a sample but loaded with flexural elements, taking into account the creep from open loop operation. The displacement $z_p$ results from equation 8, with $F_m=F_{flex}+F_s$, so that viscoelastic properties can be derived from the magnitude and phase of $$\frac{F_s}{z_p} \sim G^* \cdot \frac{S}{H}.$$

Figure 13:
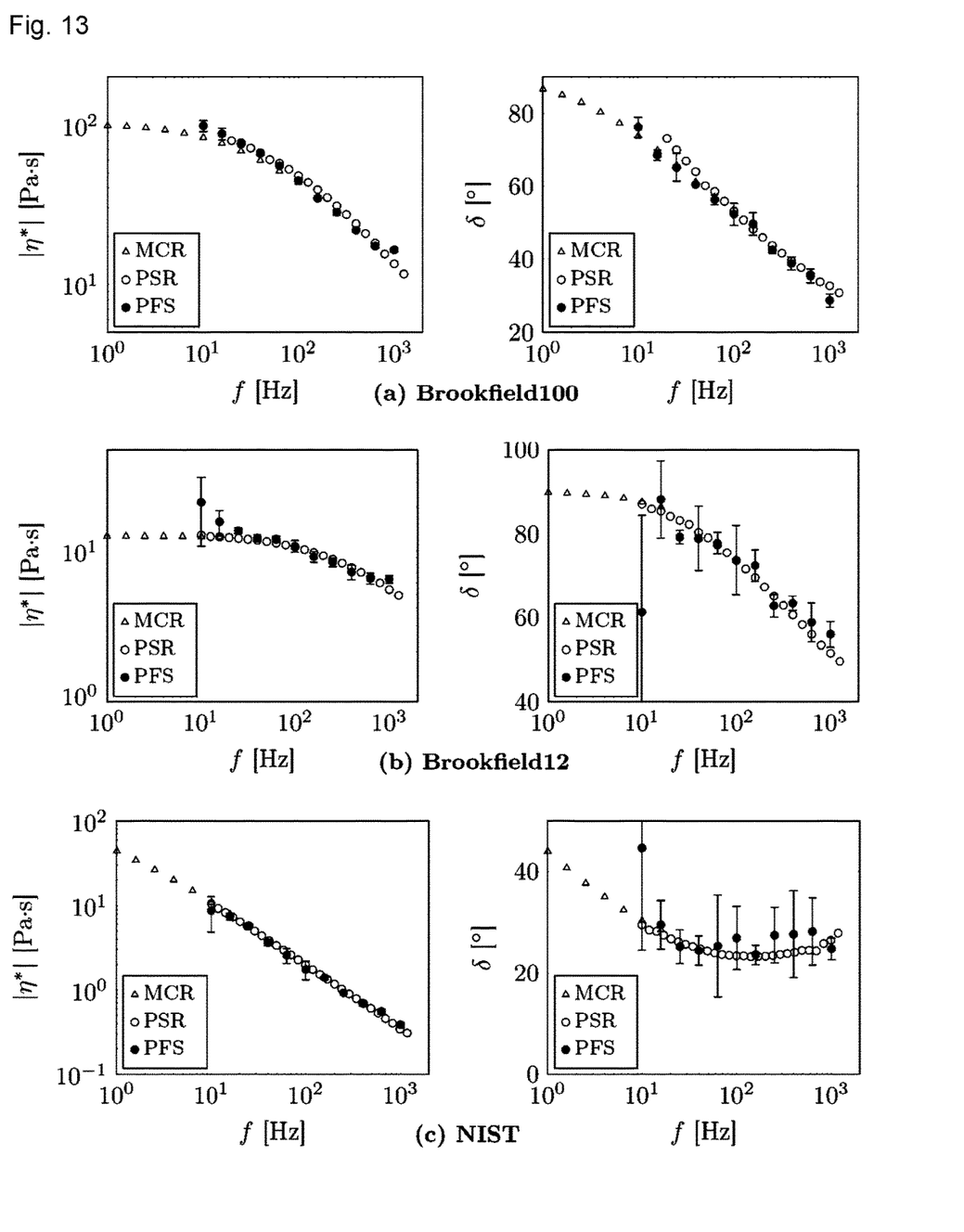
FIG. 13 shows the results of rheological measurements of standard samples obtained with the rheometer according to the invention (PFS) compared to measurements on a conventional stress-controlled rheometer (MCR) and on a self-built piezo shear rheometer (PSR)

FIG. 13 compares the results for the three different standards with measurement data obtained from a conventional, stress-controlled instrument (at low frequencies) and from a homebuilt piezo shear rheometer with decoupled attenuator and sensor (Schroyen et al., Soft Matter 2017, DOI: 10.1039/c7cm01690e). Except for fitting the amplitude with a constant factor, $|\eta^*|$ and $\delta$ are directly taken from $F_s/z_p$ (equations 8 and 10). Note that when performing measurements from the moving surface rather than the reflector surface, such as the case here, deviations from the gap loading limit establish at lower frequencies. For instance for the NIST standard, substantial deviations occurred for f>250 Hz at the current gap setting of 200 μm, with an underestimation of the modulus and overestimation of the phase. Corrections for the propagating shear wave were hence required.

Figure 14:
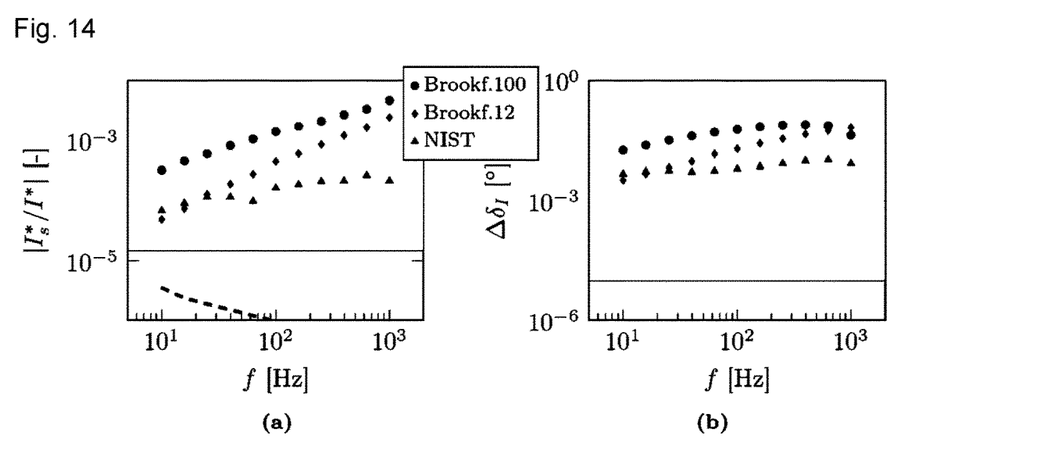
FIG. 14 shows the amplitude ratio and phase shift of the current generated by a sample over the total current obtained from rheological measurements of standard samples obtained with the rheometer according to the invention.

The overall behaviour of both the amplitude and phase is measured well by the flexure setup for all 3 standards. However, results for the Brookfield 12 and NIST standard in particular show considerable scatter. The phase angle is more sensitive to this. FIG. 14 compares the amplitude and phase shift of the current signal generated by the sample ($I_s$) with the detection limits. The phase shift generated by the sample is orders of magnitude above the detection limit. The current amplitude, e.g. for the NIST standard, is >10× above the random input noise level but only 5-10× above the resolution limit of the 16-bit oscilloscope. In addition, the signal induced by the sample is orders of magnitude smaller than that stemming from the flexural elements (FIG. 11). Both factors can lead to increased scatter.

| List of reference numerals | |
|---|---|
| 1 | Rotational shear rheometer |
| 10 | First plate |
| 10a | Radial extension |
| 10b | Through-hole |
| 11 | First flexure |
| 12 | First flexural element |
| 13 | Second flexural element |
| 14 | Base |
| 15 | Shaft |
| 16 | Opening |
| 17 | Inner Ring |
| 18 | Outer Ring |
| 20 | Second flexure |
| 20a | Longitudinal extension |
| 20b | Through-hole |
| 21 | Third flexural element |
| 21a | Bottom end |
| 21b | Top end |
| 22 | Fourth flexural element |
| 22a | Bottom end |
| 22b | Top end |
| 23 | Joining element |
| 24 | Base |
| 30 | Third flexure |
| 31 | Fifth flexural element |
| 32 | Joining element |
| 32a | Recess |
| 32b | Opening |
| 32c | First through hole |
| 32d | Second through hole |
| 33 | Base |
| 33a | Through-hole |
| 40 | Piezoelectric element |
| 41 | First end |
| 41a | First protrusion |
| 42 | Second end |
| 42a | Second protrusion |
| 43 | First holding element |
| 43a | First recess |
| 44 | Second holding element |
| 44a | Second recess |
| 45 | First joint |
| 46 | Second joint |
| 47 | Piezoelectric plate |
| 50 | Adjusting element |
| 51 | Through hole |
| 60 | Support |
| 61 | Support plate |
| 62 | Support base |
| 63 | Cavity |
| 64 | Through-hole |
| 70 | Ring element |
| 71 | First through hole |
| 72 | Second through hole |
| 73 | Third through hole |
| 80 | Second plate |
| 81 | First through hole |
| 82 | Second through hole |
| 90 | Cone |
| G | gap |
| L | Longitudinal axis |
| P | Pivot axis |
| l | Length |
| h | Height |
| t | Thickness |

The invention claimed is:

1. A rotational shear rheometer (1) comprising
a first plate (10) configured to contact a sample,
a first flexure (11) connecting the first plate (10) to a support (60), such that the first plate (10) is pivotable about a pivot axis (P) in respect of the support (60),
a piezoelectric element (40) extending between a first end (41) and a second end (42) along a longitudinal axis (L) arranged tangentially in respect of the pivot axis (P), wherein said piezoelectric element (40) is configured to elongate and/or undergo compression along said longitudinal axis (L), and wherein said first end (41) is mechanically coupled to said first plate (10), wherein said piezoelectric element (40) is configured as an actuator capable of introducing a torque to the first plate (10) about said pivot axis (P) as a result of elongation or compression of the piezoelectric element (40), wherein
said first flexure (11) comprises a first flexural element (12) and a second flexural element (13) non-parallel to the first flexural element (12), wherein the first flexural element (12) and the second flexural element (13) connect said first plate (10) to said support (60), extend radially in respect of the pivot axis (P), and intersect with the pivot axis (P), and wherein
said piezoelectric element (40) is further configured as a sensor capable of detecting a torque acting on said first plate (10).

2. The rotational shear rheometer (1) according to claim 1, characterized in that the first flexural element (12) is arranged at an angle of 70° to 110° with respect to the second flexural element (13).

3. The rotational shear rheometer (1) according to claim 1, characterized in that the first flexure (11) has a translational stiffness ($k_T$=F/□), and a rotational stiffness ($k_R$=M/□) in respect of a rotation (□) about the pivot axis (P) and, wherein a ratio ($k_T/(k_R/r)$) between the translational stiffness ($k_T$) and the rotational stiffness ($k_R$) divided by a radius (r) of the first plate (10) is at least 10:1.

4. The rotational shear rheometer (1) according to claim 1, characterized in that the rotational shear rheometer (1) comprises a second flexure (20) mechanically coupling said first end (41) of said piezoelectric element (40) to said first plate (10).

5. The rotational shear rheometer (1) according to claim 4, characterized in that said second flexure (20) comprises a third flexural element (21) and a fourth flexural element (22), wherein the third flexural element (21) and the fourth flexural element (22) each extend perpendicular to said longitudinal axis (L).

6. The rotational shear rheometer (1) according to claim 4, characterized in that said second flexure (20) has a first translational stiffness ($k_1$=F/□) in respect of a displacement (□) perpendicular to said longitudinal axis (L) and a second translational stiffness ($k_2$=F/□) in respect of a displacement (□) along said longitudinal axis (L), wherein a ratio ($k_1/k_2$)

between the first translational stiffness ($k_1$) and the second translational stiffness ($k_2$) is at least 10:1.

7. The rotational shear rheometer (1) according to claim 4, characterized in that said second flexure (20) comprises a joining element (23) mechanically coupling said first end (41) of said piezoelectric element (40) to said first plate (10).

8. The rotational shear rheometer (1) according to claim 4, characterized in that the first plate (10) comprises a radial extension (10a) extending radially in respect of the pivot axis (P), wherein said radial extension (10a) is mechanically coupled to said first end (41) of the piezoelectric element (40).

9. The rotational shear rheometer (1) according to claim 1, characterized in that the rotational shear rheometer (1) comprises an adjusting element (50) for adjusting a position and/or a prestress of the piezoelectric element (40) along the longitudinal axis (40).

10. The rotational shear rheometer (1) according to claim 1, characterized in that the piezoelectric element (40) comprises a plurality of piezoelectric plates stacked along said longitudinal axis (L).

11. The rotational shear rheometer (1) according to claim 1, characterized in that the piezoelectric element (40) and the first flexure (11) each comprise a respective translational stiffness ($k=F/\Box\Box$ in respect of a displacement ($\Box$) along the longitudinal axis (L), wherein a ratio between said translational stiffness ($k=F/\Box\Box$ of the piezoelectric element (40) and said translational stiffness ($k=F/\Box\Box$ of the first flexure (11) is at least 10:1.

12. The rotational shear rheometer (1) according to claim 1, characterized in that the rotational shear rheometer (1) comprises a first holding element (43) and a second holding element (44) for holding the piezoelectric element (40), wherein the first holding element (43) comprises a first recess (43a) and the second holding element (44) comprises a second recess (44a), wherein the first end (41) of the piezoelectric element (40) comprises a first protrusion (41a) for engaging the first recess (43a), and wherein the second end (42) of the piezoelectric element (40) comprises a second protrusion (42a) for engaging the second recess (44a), or the first holding element (43) is connected to the piezoelectric element (40) by means of a first joint (45), and the second holding element (44) is connected to the piezoelectric element (40) by means of a second joint (46), wherein the first and the second joint (45, 46) are pivotable about said pivot axis (P), said longitudinal axis (L) and a further axis which is perpendicular to the pivot axis (P) and the longitudinal axis (L).

13. The rotational shear rheometer (1) according to claim 1, characterized in that the rotational shear rheometer (1) comprises a second plate (80) or a cone (90), wherein the first plate (10) and the second plate (80) or the first plate (10) and the cone (90) form a gap (G) for receiving a sample.

14. A method for determining mechanical properties of a sample using the rotational shear rheometer according to claim 1, wherein a rotational shear rheometer according to claim 1 is provided, a sample is provided in a gap (G) between said first plate (10) and a second plate (80) or a cone (90), a voltage is applied to said piezoelectric element (40), such that the piezoelectric element (40) extends or undergoes compression along the longitudinal axis (L), resulting in a pivoting motion of the first plate (10) about the pivot axis (P) with respect to the support (60), wherein a shear deformation is introduced to said sample, a torque exerted on the first plate (10) by said sample due to the shear deformation is determined by the piezoelectric element (40).

* * * * *